March 9, 1943.                    A. D. HODGSON                    2,313,071
                         OSCILLATION GENERATOR AND MODULATOR
                    Filed Oct. 10, 1931           3 Sheets-Sheet 1
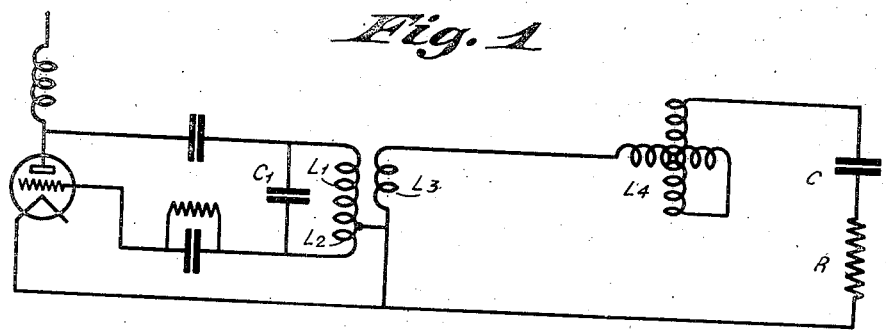
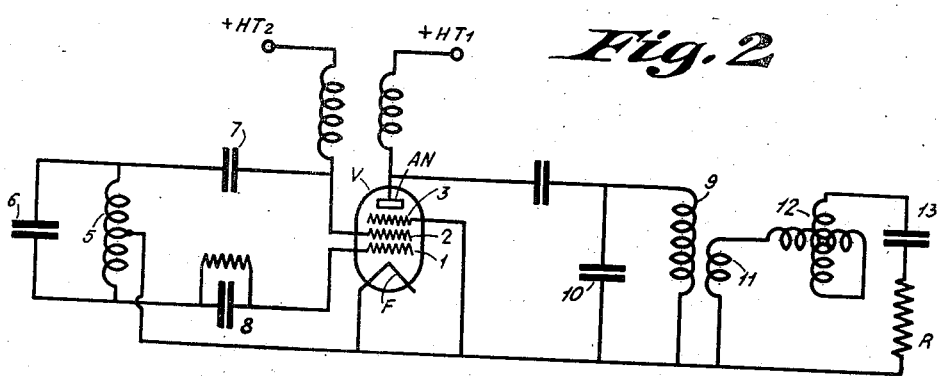
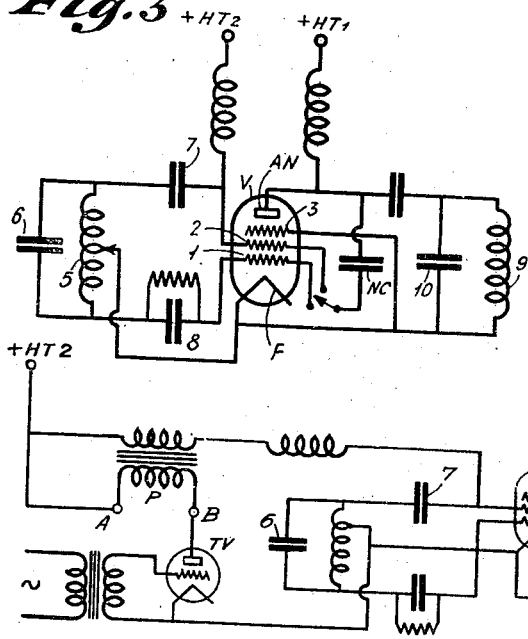
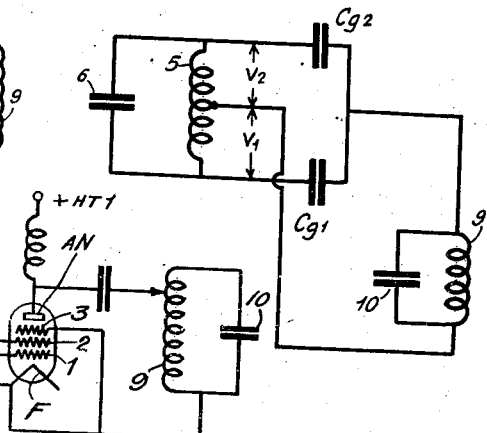
INVENTOR
ALAN D'ARCY HODGSON
BY
ATTORNEY March 9, 1943.  A. D. HODGSON  2,313,071
OSCILLATION GENERATOR AND MODULATOR
Filed Oct. 10, 1931  3 Sheets-Sheet 2

INVENTOR
ALAN D'ARCY HODGSON
BY H. S. Grover
ATTORNEY

March 9, 1943.    A. D. HODGSON    2,313,071
OSCILLATION GENERATOR AND MODULATOR
Filed Oct. 10, 1931    3 Sheets-Sheet 3
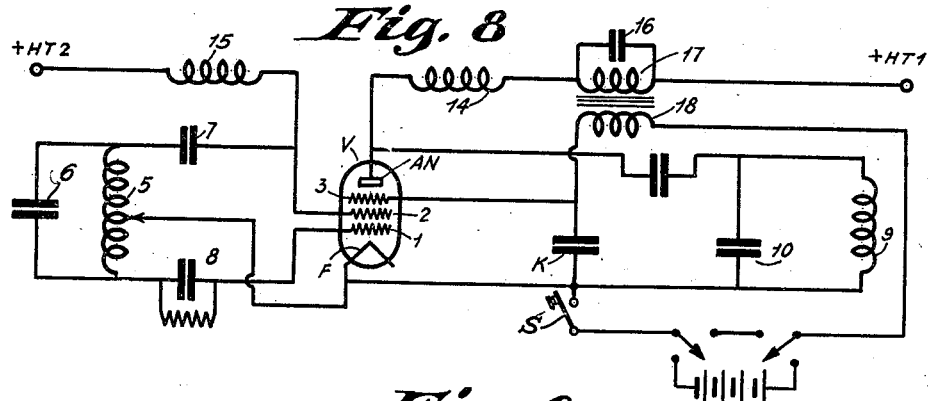
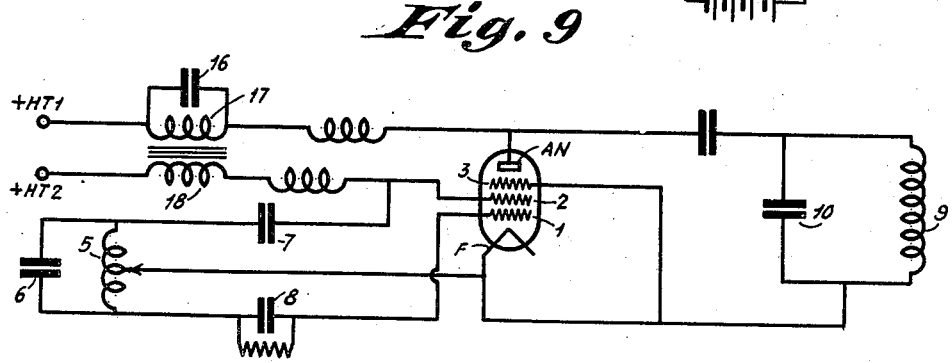
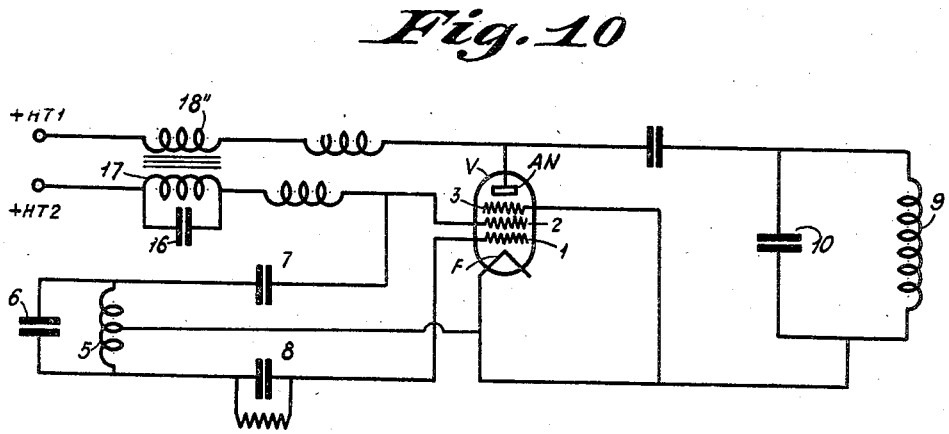
INVENTOR
ALAN D'ARCY HODGSON
BY
ATTORNEY Patented Mar. 9, 1943

2,313,071

UNITED STATES PATENT OFFICE 2,313,071

OSCILLATION GENERATOR AND MODULATOR

Alan D'Arcy Hodgson, Bedford, England, assignor to Radio Corporation of America, a corporation of Delaware Application October 10, 1931, Serial No. 568,058
In Great Britain October 20, 1930

16 Claims. (Cl. 250—36)

This invention relates to thermionic oscillation generators and to signalling and other systems incorporating such generators.

The novel circuit arrangements involved and the operation thereof will become apparent to the reader from the detailed description of the invention which follows and therefrom when read in connection with the attached drawings throughout which like reference characters indicate like parts and in which:

Figure 1 illustrates the general nature of the circuits which are to be improved;

Figure 2 shows diagrammatically one generator circuit arrangement wherein features of the present invention are incorporated;

Figure 3 shows a modification of the arrangement of Figure 2, Figure 4 shows a simplified circuit which is equivalent to the circuit of Figure 3, Figures 6 to 11, inclusive show modifications of the oscillators of the prior figures and include means for modulating the oscillations produced; while

Figure 5:
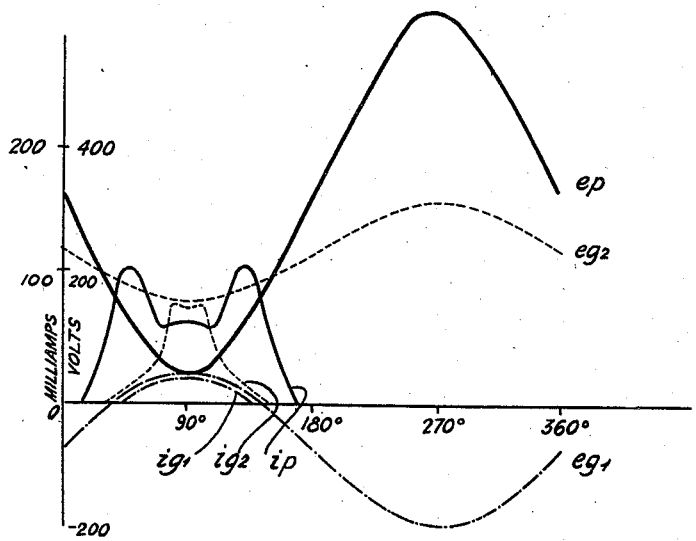
Figure 5 is a curve illustrating a mode of operation of the invention.

Figure 1 of the accompanying drawings shows a very common form of tube oscillator in which the exciting voltage fed to the grid of the tube is derived from the output circuit of the tube. In the said Figure 1 the tube circuit arrangement incorporates the usual parallel oscillatory circuit comprising condenser $C_1$ and inductance coils $L_1$ and $L_2$, the the inductance in said parallel circuit being coupled by means of a coupling coil $L_3$ to a circuit including a loading coil $L_4$ and a load device, for example, an aerial, represented by a resistance R and capacity C. As will be seen the grid of the tube derives its exciting voltage from the output circuit. Now when in a circuit arrangement of this kind the circuit consisting of the coupling coil $L_3$, the loading coil $L_4$, the capacity C and the resistance R is tuned to resonance, the apparent reactance of the circuit $L_1$ $L_2$ $C_1$ will change at certain values of coupling between the coil $L_3$ and the coils coupled thereto and in consequence the frequency generated may suddenly decrease or increase. This difficulty is apt to be of considerable importance since in order to obtain maximum output from the oscillator fairly tight coupling is often necessary and in these circumstances stability will often be found to be difficult to obtain with high power outputs.

According to this invetnion a thermionic oscillation generator comprises a multi-grid tube having its electrodes associated with frequency determining and output circuits and the necessary feedback across the tube is obtained otherwise than from the output circuit, the whole arrangement being such that the frequency determining circuit will be substantially unaffected by reactance changes in the output circuit.

One way of carrying out the invention is shown in Figure 2 of the accompanying drawings. Referring to this figure the tube V is a five-electrode tube comprising a filament F, a grid 1 adjacent said filament, a grid 2 next to the grid 1, a grid 3 next to the grid 2, and an anode AN adjacent the grid 3. The frequency determining circuit of this tube consists of an inductance 5 and a capacity 6 in parallel and is effectively connected as shown between the grids 1 and 2 via the condensers 7 and 8. The tube output circuit in effect consists of the usual inductance 9 and capacity 10, coupling coil 11, loading coil 12 and an aerial or other load represented by resistance R and capacity 13 and, as will be seen, it is generally similar to that of the tube shown in Figure 1. It will be seen, however, that in Figure 2 the necessary energy feedback for maintaining the circuit 5, 6, oscillating is derived via the capacity 7 and therefore, except as regards such small changes as may be produced by changes in voltage swings on the two grids concerned due to interelectrode capacity and variations in the anode high frequency voltage, the frequency determining circuit will not be affected by changes of reactance in the output circuit. To put the matter in another way owing to the fact that the grid circuits of the tube are for all practical purposes isolated from the coupled circuit associated with the output electrode of the tube, the frequency of the electromotive-force generated will not be liable to sudden changes due to "pulling" of the coupled circuits associated with the tube output whereas in the arrangement of Figure 1 the voltage fed to the grid of the tube virtually depends to a large degree upon the coupled circuits.

In the arrangement of Figure 2 the third grid 3 will of course act as an electrostatic screen between the anode and the grids 1 and 2. Although some screening is desirable it is not necessary that the grid 3 should be a substantially perfect electrostatic screen, its main purpose being to prevent the development of a negative resistance characteristic in the tube due to secondary emission. It will be apparent from the position of the oscillator circuit 5, 6, that the voltages on the grids 1 and 2 will be substantially 180° out of phase and therefore the voltage induced on the anode due to the capacity of the grid 2 with respect to the anode will be 180° out of phase with the voltage induced from the grid 1. The magnitude of these induced voltages will, of course, be an inverse function of the distance between the anode and the respective grids and if, therefore, the induced anode voltage from grid 1 is much larger than that from grid 2, the tube may be neutralized by a small capacity connected between the anode and the grid 2. If, on the other hand, the induced voltage from grid 2 is the larger the neutralizing capacity should be connected between the anode and the grid 1.

An arrangement in which a neutralizing capacity is incorporated is shown in the accompanying Figure 3 wherein NC represents the neutralizing condenser. This condenser may be connected on its grid side either to the grid 1 or to the grid 2 as desired by the switch shown. It is also possible to obtain neutralization without the use of an additional condenser by adjusting the position of the tapping point on 5 as shown in Figure 3 so that the voltages induced on the anode from the two grids will be equal and opposite. If this tapping point is varied until the ratio of voltage on grid 1 to the voltage on grid 2 is such that no voltage is obtained across the coil 9 when this is tuned to resonance with the circuit 5, 6, the power supply to the anode being, of course, temporarily disconnected for this test, the condition of neutralization will have been achieved.

This will appear more clearly from the accompanying Figure 4 which shows the equivalent circuit of the tube generator. In this figure $C_{g1}$ $C_{g2}$ represent the capacities between the grids 1 and 2 respectively and the anode. If $V_1$ and $V_2$ are the high frequency voltages on the grids 1 and 2 then there will be no voltage across the coil 9; if the ratio between $V_1$ and $V_2$ equals the ratio between $C_{g1}$ and $C_{g2}$: i. e. the circuit is in effect a balanced bridge network. Since the amplification factor between grid 1 and the anode is the product of the amplification factors between grids 1 and 2 and the grid 2 and the anode under normal circumstances, the voltage generated in the output circuit will always be controlled by the voltage on grid 1 even through there may exist an approximately equal voltage swing on grid 2.

In Figure 4 the capacity between the grid 3 and the anode is not represented as this is virtually a capacity in parallel with the condenser 10.

If desired, frequency multiplication may be obtained by adjusting the voltage swings on the anodes and grids and in particular the voltage swing on the grid 2 may be made to have a considerable effect on the wave form of the anode current.

This is graphically illustrated in Figure 5 of the accompanying drawings wherein are shown in graphical form the voltage swings and currents of the tube. In Figure 5 the anode voltage swing is shown by the full curve $e_p$ and the current by the full curve $i_p$. The curve $e_{g2}$ shows the voltage swing on the grid 2, the current flowing to this grid being shown by the curve $i_{g2}$ Similarly, the voltage and current of grid 1 are represented by the curves $e_{g1}$ and $i_{g1}$ respectively. In the curves of Figure 5 the abscissae are degrees and the ordinates are milliamperes or volts according as to whether the curves are current curves or voltage curves. From these curves it will be seen that current flows through the tube when the voltage to the anode and to the grid 2 is low. At 90° the anode voltage is 50 and the voltage of grid 2 is 160, in the particular case graphically illustrated in Figure 5. At this point in the cycle, therefore, a greater part of the emission will be attracted to grid 2 than to the anode and the anode current will be less than the current of grid 2. At 50° and at 130° the anode current is at maximum, while below 50° and beyond 130° grid 1 begins to swing negative and the anode current falls rapidly to zero at 0 and 180°. By further reducing the anode voltage at 90 the anode current may be made to approximate to two sharp pulses of current having maximum amplitudes at 45° and 135° and approximate zero amplitudes at 0°, 90° and 180°, thereby providing double the initial frequency in the anode circuit and the anode may further be tuned to a multiple of this double frequency. A harmonic analysis of the anode current curve will show considerable proportions of second, fourth and fifth harmonics to be present with quite small proportions of third and sixth harmonics. By suitable voltage swings the odd or even harmonics may be accentuated as desired.

Again, by increasing the anode voltage and decreasing the voltage upon grid 2 so that at 90° these voltages are more nearly equal, the dip in the anode current curve may be removed and the anode current wave form may be made approximately square.

An important point to be noted is that in all cases the No. 1 grid is not overdriven and the leak resistance in the conductor leading thereto and shunting the condenser 8 should be of fairly low value so that said grid is positive for a considerable period of the cycle.

Figure 6:
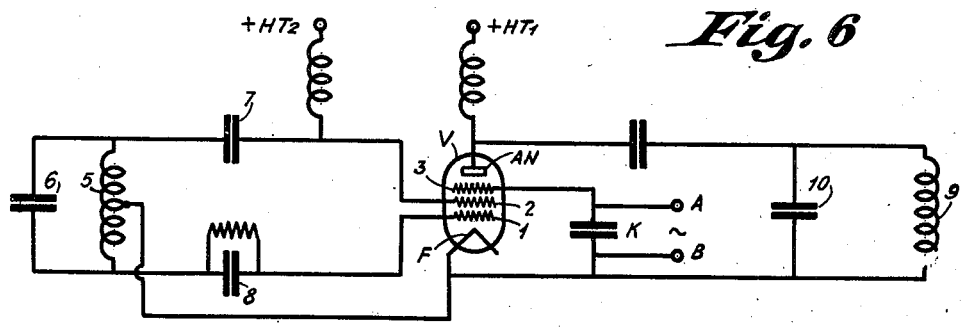

Figure 6 of the accompanying drawings shows an arrangement in which modulation of the oscillation generated may be obtained by applying modulated potentials to the grid 3. As will be seen, the grid 3 is kept at substantially earth potential as regards high frequency currents by means of the condenser K, the modulating potential which may, for example, correspond to speech, being applied at the terminals A and B across the condenser K.

Figure 7:
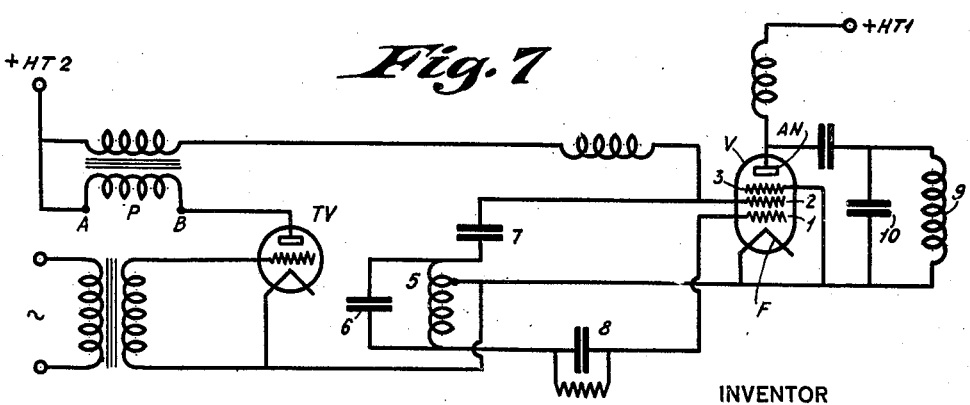

It is also possible to feed modulation via grid 2 for if the voltage swings on this grid are such that the circuit 5, 6, is not oscillating too strongly, then the relation between the current in the aerial or other load R and the voltage upon the grid 2 will be substantially linear until the grid voltage approaches the anode voltage. Therefore, by reducing the direct current voltage upon the grid 2 and superimposing a desired modulating voltage, satisfactory modulation may be obtained. A circuit for accomplishing modulation in this manner is shown in the accompanying Figure 7 wherein modulation voltages are applied to the primary of a transformer P at the points A and B, the secondary of the said transformer being in series with the lead supplying direct current potential to the grid 2. Owing to the fact that for satisfactory speed transmission the direct current voltage applied to grid 2 has to be quite low (of the order of ⅕th of that supplied to the anode) a small triode tube, shown at TV in Figure 7, is preferably provided for amplifying the modulating voltages, this triode receiving anode potential from the same point which supplies potential to the grid 2. In this way a considerable degree of modulation may be obtained with quite a low value of modulating power and in actual practice a ratio of modulation power to oscillator power of 1:10 has been obtained.

In the accompanying Figure 8 is shown a further adaptation of the invention for the generation of I. C. W. It is thought that the general arrangement of Figure 8 will be apparent from the foregoing description. The carrier frequency is determined by the frequency of the circuit 5, 6, and the amplified output is obtained in the circuit 9, 10. The anode and the grid 2 are fed through chokes 14, 15, respectively as in the previously described arrangements. In the anode circuit between the choke 14 and the anode potential terminal HT1 is a circuit 16, 17, tuned to the modulating frequency required, this circuit being maintained oscillating by being coupled to a coil 18 in circuit with the grid 3. The condenser K serves to earth the grid 3 as regards high frequency and the coil 18 should be as small as is consistent with maintaining the circuit 16, 17 oscillating. It is, of course, not desired that the coil 18 and the condenser K should resonate to the modulating frequencies. The oscillations built up in the circuit 16, 17, will result in modification of the direct current supply to the valve anode and in this way modulation will be achieved. A key S is inserted in series in the circuit K, S, 18 and if desired a small source of potential may also be included in this circuit, so that a small positive potential is applied to the third grid.

Figure 9 shows an alternative arrangement wherein the circuit 16, 17, is maintained oscillating by being coupled to an inductance 18' in series with the direct current supply lead to the grid 2. The coil 18' should, as before, be as small as is consistent with the maintenance of proper excitation.

In the accompanying Figure 10 is shown a still further modification for the generation of I. C. W. In this modification the oscillatory circuit 16, 17, is inserted in the direct current supply lead for the grid 2, excitation being maintained by coupling to a coil 18" in the direct current supply lead to the anode of the valve.

It is desirable in cases of grid modulation that the anode voltage swing should be less than the maximum swing obtainable so that on modulation the amplitude of the anode voltage may be increased.

This will be better understood from the following practical example:

If the direct current supply to the anode is say 400 volts then the theoretical maximum amplitude of the high frequency voltage on the anode will be 400 volts; in practice this is never realized and a maximum amplitude of 300-350 will be obtained.

When grid modulation is resorted to the direct current supply of the anode is not in any way modified and in order to obtain a linear relation between the amplitude of the anode voltage swing and the modulating voltage, the initial amplitude of the anode voltage must be reduced to such a point that on modulation the amplitude may increase towards the theoretical limit i. e. in the particular case instanced towards 400 volts.

This may be obtained by suitable adjustment of the anode circuit which need not affect the coupling arrangements of the aerial. Such an arrangement is shown in the accompanying Figure 11 in which, as will be seen, the anode connection to the inductance 9 of the oscillatory circuit is made at a point between the earth and high potential ends. These considerations are applicable to all cases of grid modulation.

In arrangements in accordance with this invention the potential applied to the third grid has a considerable influence on the characteristics of the tube and more particularly upon the tendency of the valve to develop negative resistance effects. Although in Figures 2, 3, 6, 7, 8, 9, 10 and 11 the third grid has been shown as connected to the cathode either directly or through a condenser which for high frequency approximates to a short circuit, it is to be understood that such connections are only to be taken as representing earthing the third grid as respects high frequency. It may in many cases be necessary or desirable to provide a suitable source of biasing potential in the high frequency earthing lead for the grid 3.

It will further be noted that during the period of the cycle when the anode voltage is less than the voltage upon the grid 2 if there is no retarding field between the anode and the grid 2 an increase of anode voltage will cause a decrease of anode current and an increase in the current of grid 2. From this it follows that control of the wave form of the anode and grid currents either for purposes of frequency multiplication or otherwise may be obtained by superimposed control voltage variations upon the grid 3; i. e., the arrangement described hereinbefore may be modified by including in the lead to the grid 3 means for imposing control voltages.

Having thus described my invention and the operation thereof, what I claim is:

1. Oscillation generating means including, a closure member, an electron emission element therein, a plurality of grid like electrodes, and an anode electrode, a frequency determining circuit regeneratively coupled between two of said grid like electrodes and said cathode, means for applying direct current potential to said electrodes, an oscillation circuit connected between said anode electrode and said cathode, said oscillation circuit and said frequency determining circuit being substantially magnetically isolated, means for tuning said oscillation circuit to a harmonic of the frequency to which said fundamental circuit is tuned, and means for preventing reaction between said oscillation circuit and said frequency determining circuit comprising a neutralizing capacity connected on the one hand to said anode electrode and on the other hand to a switch having two contact members connected to different points on said frequency determining circuit.

2. A system for signalling with wave signaling energy comprising an electron tube having oscillation-generator-elements including a cathode, a control grid and an oscillator anode and at least one auxiliary element, an inductance and capacity in parallel tuned to the frequency of the oscillations to be generated coupled between said grid and oscillator anode with a point on said inductance connected to the cathode of said tube for the self generation of oscillations by said tube and for varying the electron stream of said tube at a frequency determined by said oscillations, means for simultaneously varying said electron stream at a frequency determined by said signaling energy, means for utilizing the resulting variations in said electron stream to set up a flow of current at a third frequency in an auxiliary circuit disposed between said auxiliary element and one of said generator elements, and means comprising a shield element having a connection with said auxiliary circuit of low reactance at the frequency of said oscillations whereby the electron stream between said generator-elements is shielded electrostatically from the tube elements other than said generator elements.

3. A system for signalling with wave signaling energy comprising an electron tube having oscillation-generator-elements including a cathode, a control grid and an oscillator anode and at least one auxiliary element, an inductance and a capacity in parallel tuned to the frequency of the oscillations to be generated coupled between said grid and oscillator anode with a point intermediate the ends of said parallel combination connected to the cathode of said tube for the self generation of oscillations by said tube and for varying the electron stream of said tube at a frequency determined by said oscillations, means for simultaneosly varying said electron stream at a frequency determined by said signaling energy, means for utilizing the resulting variations in said electron stream to set up a flow of current at a third frequency in an auxiliary circuit disposed between said auxiliary element and one of said generator-elements, and shielding means within said tube having a connection to said auxiliary circuit comprising a path of relatively low reactance at the frequency of said oscillations and signaling energy.

4. A system for signalling with wave signaling energy comprising an electron tube including cathode, grid, anode and second anode elements, circuits for the self-generation of oscillations disposed between said cathode, grid and first mentioned anode element for varying the electron stream of said tube at the frequency of said oscillations, means for varying the electron stream of said tube in accordance with the frequencies of said wave signaling energy, a circuit disposed between said second anode and cathode elements and including an output device, means for maintaining said second anode electro-positive with respect to said cathode, means for setting up a flow of current in said output device which varies at frequencies determined by the combined effect upon the electron stream of the frequency of said oscillations and the frequencies of said wave signaling energy whereby the potential across said output device is caused to vary in accordance with said flow of current, means for neutralizing the capacity between said second anode and said first mentioned anode, and means for substantially electrostatically shielding that portion of the electron stream between said cathode and anode elements from the influence of said varying potential across said output device.

5. In a wave generator, an electron discharge device having an electron emission element, an outer anode, an inner anode, a cathode and a grid-like electrode, a frequency determining circuit including a reactance connecting said cathode, said inner anode and said grid-like electrode in an oscillation generating circuit, an output circuit connected between the anode and cathode of said device, and means for neutralizing the capacity existing between said outer anode and said grid electrode including a capacity element connected between said outer anode and inner anode.

6. A wave generator as recited in claim 5 wherein means is included in said output circuit to tune the same to a harmonic of the frequency determined by said first named circuit.

7. In a wave generator, an electron discharge device having a cathode, an inner anode, an outer anode and a grid electrode, a frequency determining circuit including a reactance connecting said cathode, said inner anode and said grid electrode in an oscillation generating circuit, an output circuit connected between the anode and cathode of said tube, a neutralizing capacity included in a connection between said inner and outer anodes, and means for shielding said anode and output circuit from said other electrodes and circuits including a shielding electrode in said tube adjacent said anode, and a circuit connecting said shielding electrode substantially directly to said cathode.

8. A wave generator as recited in claim 7 wherein means is included in said output circuit to tune the same to a harmonic of the frequency determined by said first named circuit.

9. In an oscillation generator, a tube having an electron emission element, an anode and a plurality of grid electrodes one of which serves as an anode electrode, and a second of which serves as a control electrode, a frequency determining circuit connected at its terminals to said grid electrode which serves as an anode, and to said control electrode respectively and at a point intermediate its terminals to said emission element, an oscillation circuit connected between said anode electrode and said emission element, a capacity coupled between said anode and grid serving as an anode, an auxiliary electrode in said tube between said anode and the other electrodes for shielding the anode from said other electrodes, and a low impedance connection between said auxiliary electrode and said emission electrode.

10. Oscillation generating means including, a closure member, an electron emission element therein, a plurality of grid like electrodes and an anode electrode, a frequency determining circuit regeneratively coupled between two of said grid like electrodes and said cathode, means for applying direct current potential to said electrodes, an oscillation circuit connected between said anode electrode and said cathode, said oscillation circuit and said frequency determining circuit being substantially magnetically isolated, and means for preventing reaction between said oscillation circuit and said frequency determining circuit comprising a neutralizing capacity connected on the one hand to said anode electrode and on the other hand to a switch having two contact members connected to different points on said frequency determining circuit.

11. A wave energy signalling system including, an electron discharge tube having oscillation-generator electrodes comprising, a cathode, a control grid and an oscillation generator anode, a shielding electrode, and an output electrode shielded from other of said electrodes by said shielding electrode, connections including said generator electrodes in a regenerative circuit including reactance tuned to the frequency of the oscillations generated coupled between said control grid and oscillator anode with a point on said reactance coupled to said cathode for the self-generation of oscillations by said tube and for varying the electron stream of said tube at a frequency determined by said oscillations, means for simultaneously varying said electron stream at a frequency determined by signalling energy, means for utilizing the resulting variations in said electron stream to set up a flow of current at a frequency determined by the combined effect upon the electron stream of the frequency of the generated oscillations and of the signalling energy, in an output circuit connected with said output electrode and tuned to the frequency of the oscillations generated, and means including said shielding electrode having a connection with said output circuit of low reactance at the frequency of said generated oscillations whereby the electron stream between said generator electrodes is shielded electrostatically from the tube electrodes other than said generator electrodes.

12. In a system responsive to wave signalling energy, an electron discharge tube having oscillation-generator elements including a cathode, a shielding electrode and at least one auxiliary element, said shielding grid being located between said auxiliary element and the oscillation generator elements, means including said generator elements for the self generation of oscillations by said tube and for varying the electron stream of said tube at a frequency determined by said oscillations, means coupled with said shielding electrode for simultaneously varying said electron stream at a frequency determined by signalling energy, means for utilizing the resulting variations in said electron stream to set up a flow of current, the frequency of which is determined by the frequency of the generated oscillations and the signalling energy, in an auxiliary circuit disposed between said auxiliary element and said cathode, and means including said shield element having a connection with said cathode of low reactance at the frequency of said oscillations whereby the electron stream between said generator elements is shielded electrostatically from the auxiliary element.

13. In a system responsive to wave signalling energy, an electron discharge tube including a cathode, a grid, an anode and a second anode, circuits for the self-generation of oscillations disposed between said cathode, grid and first mentioned anode element for varying the electron stream of said tube at the frequency of said generated oscillations, means coupled with said first named anode for varying the electron stream of said tube in accordance with the frequencies of wave signalling energy, means for maintaining said second anode electro-positive with respect to said cathode, an output circuit disposed between said second anode and cathode wherein a flow of current is set up which varies at frequencies determined by the combined effect upon the electron stream of the frequency of said oscillations and the frequencies of said wave signalling energy whereby the potential in said output circuit is caused to vary in accordance with said flow of current, and means for substantially electrostatically shielding that portion of the electron stream between said cathode and anode elements from the influence of said varying potential in said output circuit.

14. In a system responsive to wave signalling energy, an electron tube including a cathode, a grid, a first anode, a shielding electrode and second anode, circuits for the self-generation of oscillations disposed between said cathode, grid and first anode for varying the electron stream of said tube at the frequency of said generated oscillations, means coupled with said first anode for varying the electron stream of said tube in accordance with the frequencies of other wave energy, an output circuit including an impedance disposed between said second anode and cathode wherein a flow of current is set up which varies at frequencies determined by the combined effect upon the electron stream of the frequency of said other oscillations and the frequencies of said other wave energy whereby the potential across said impedance is caused to vary in accordance with said flow of current, and a low impedance connection between said shielding electrode and said cathode for substantially electrostatically shielding that portion of the electron stream between said cathode and anode elements from the influence of said varying potential across said impedance.

15. In a system responsive to wave signalling energy, an electron discharge tube including a cathode, a grid, a first anode, a shielding grid and a second anode, said shielding grid being disposed between said second anode and the other electrodes, circuits for the self-generation of oscillations including a reactance coupled between said first anode and grid, with a connection between a point on the reactance and the cathode for varying the electron stream of said tube at the frequency of said generated oscillations, means coupled to said first anode for varying the electron stream of said tube in accordance with the frequencies of wave signalling energy, a tuned output circuit coupled between said second anode and cathode and including an impedance wherein a flow of current is set up which varies at frequencies determined by the combined effect upon the electron stream of the frequency of said oscillations and the frequency of said wave signalling energy whereby the potential across said impedance is caused to vary in accordance with said flow of current, and a low impedance connection between said shielding electrode and said output circuit for substantially electrostatically shielding that portion of the electron stream between said cathode and second anode from the influence of said varying potential across said impedance.

16. In a signalling system, an electron discharge device having a cathode, an anode, and a plurality of grid like electrodes, an oscillation generating circuit including a frequency determining reactance coupling a pair of said grid like electrodes in out of phase relation, a connection between a point on said reactance and the cathode of said tube, circuits for applying direct current potentials to electrodes in said tube to produce oscillations in said tube for varying the electron stream of said tube at the frequency of the produced oscillations, and means for also varying said electron stream in accordance with voltages of other frequencies including a pair of coupled reactances, a circuit coupling one of said coupled reactances to the anode of said tube and a circuit coupling the other of said coupled reactances to one of said grid electrodes coupled to said frequency determining circuit, an output circuit including an impedance coupled to said anode and cathode and responsive to currents of frequencies resulting from the combined effects of said produced oscillations and voltages of other frequencies on said electron stream, and means for substantially electrostatically shielding that portion of the electron stream between said cathode and anode from the influence of varying potentials across said impedance due to currents in said output circuit.

ALAN D'ARCY HODGSON.